United States Patent [19]
Mazhar

[11] Patent Number: 6,053,655
[45] Date of Patent: Apr. 25, 2000

[54] FASTENER WITH CAM ENGAGEMENT

[75] Inventor: Mohammad S. Mazhar, Macomb County, Mich.

[73] Assignee: The United States of America as represented by the Secretary of the Army, Washington, D.C.

[21] Appl. No.: 09/128,640

[22] Filed: Jul. 30, 1998

[51] Int. Cl.$^7$ ...................................................... F16B 37/08
[52] U.S. Cl. .................. 403/320; 403/408.1; 403/409.1; 403/DIG. 8; 411/433; 411/278
[58] Field of Search ..................................... 403/320, 315, 403/366, 350, 351, 352, 408.1, 409.1, DIG. 8; 411/433, 437, 278

[56] References Cited

U.S. PATENT DOCUMENTS

| | | | |
|---|---|---|---|
| 4,462,731 | 7/1984 | Rovinsky et al. | ........................ 411/433 |
| 5,921,734 | 7/1999 | Kataoka | ................................. 411/433 X |

FOREIGN PATENT DOCUMENTS

| | | | |
|---|---|---|---|
| 0332463 | 7/1930 | United Kingdom | ................... 411/278 |

*Primary Examiner*—Terry Lee Melius
*Assistant Examiner*—John R. Cottingham
*Attorney, Agent, or Firm*—David L. Kuhn; Gail S. Soderling; Peter A. Taucher

[57] ABSTRACT

A fastener comprises a nut surrounding a collar that in turn surrounds a post, the nut and collar holding a bracket element against a mounting surface. The collar fits closely but slidably within the nut. Of the nut or collar, one has a boss that rides upon a cam surface of the other, so that a camming relation exists between the nut and collar. Turning the nut relative to the collar will thus squeeze the collar into an interference fit with the post so that the fastener attains a locking configuration. A groove adjacent the cam surface accepts the projection and retains it such that the fastener maintains its locking condition. A predetermined torque is needed to rotate the projection to the groove, whereby the fastener is a torque controlled fastener.

3 Claims, 3 Drawing Sheets

FASTENER WITH CAM ENGAGEMENT

GOVERNMENT USE

The invention described here may be made, used and licensed by or for the U.S. Government for governmental purposes without paying me any royalty.

BACKGROUND

One of the desired features for modern military vehicles is quick adaptability to the broadest possible range of missions in varied conditions of terrain and climate. Typically, adapting a vehicle for different missions and conditions involves adding on certain components and removing others, these tasks usually being performed in the field.

A quickly locking, quickly releasing fastener will add to the speed and ease with which components can be changed out in a vehicle. Such a fastener will be more versatile if it possesses a torque control feature. Accordingly, I have invented a quickly locking, quickly releasing, torque controlled fastener.

SUMMARY

My fastener mounts a bracket or article to a plate or other suitable mounting element. The fastener comprises an elongate member protruding from the plate or mounting element. The fastener further comprises a nut faced on a portion of the bracket or article. The nut's a smooth inner peripheral surface surrounds a smooth outer peripheral surface of a collar located within the nut. Two sections of the collar have arcuate radially inner portions whose teeth or threads fit the elongate member.

One of the peripheral surfaces, on either the nut or the collar, has a projection and the other peripheral surface has a cam portion. The projection on the one peripheral surface rides on the cam portion of the other peripheral surface. The other peripheral surface defines a groove at the cam portion. Once the projection rides along the cam section, it enters the groove, whereupon the fastener is in a locking configuration. The torque needed to remove the projection from the groove is a predetermined value, so that the fastener has a torque control feature. Subsequent rotation of the nut will, depending on the embodiment of the fastener, either remove the projection from the groove and release the fastener, or else increase the fastener's torque in a controlled fashion.

DETAILED DESCRIPTION

Figure 1:
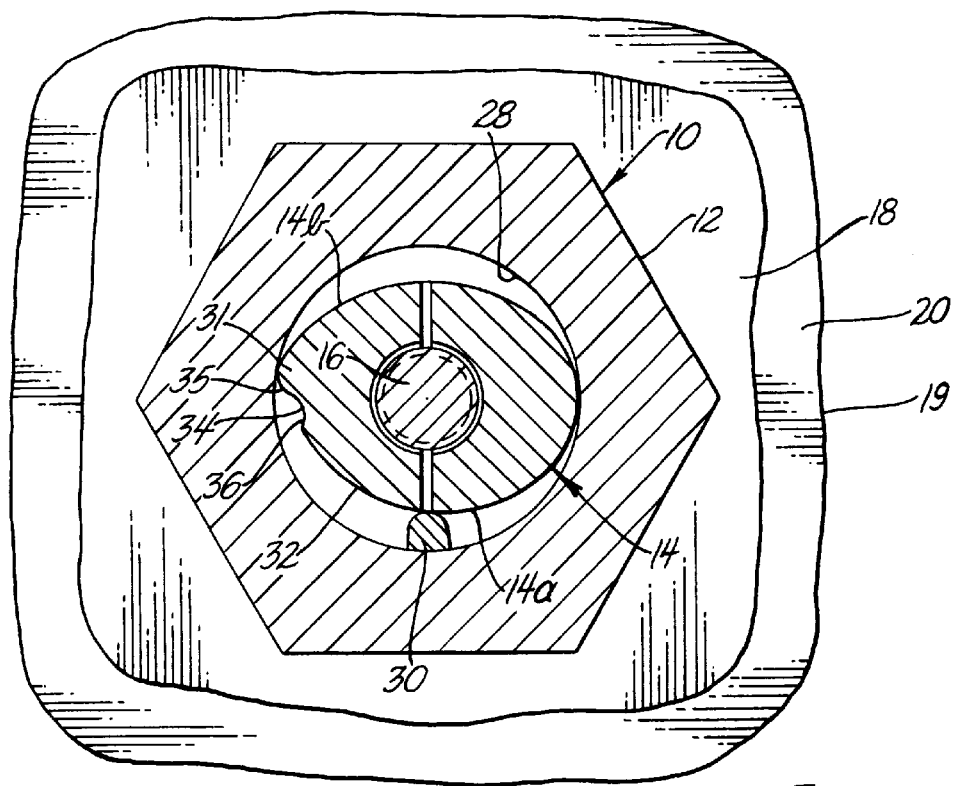
FIG. 1 is a plan sectional view of preferred embodiment of my fastener.
Figure 2:
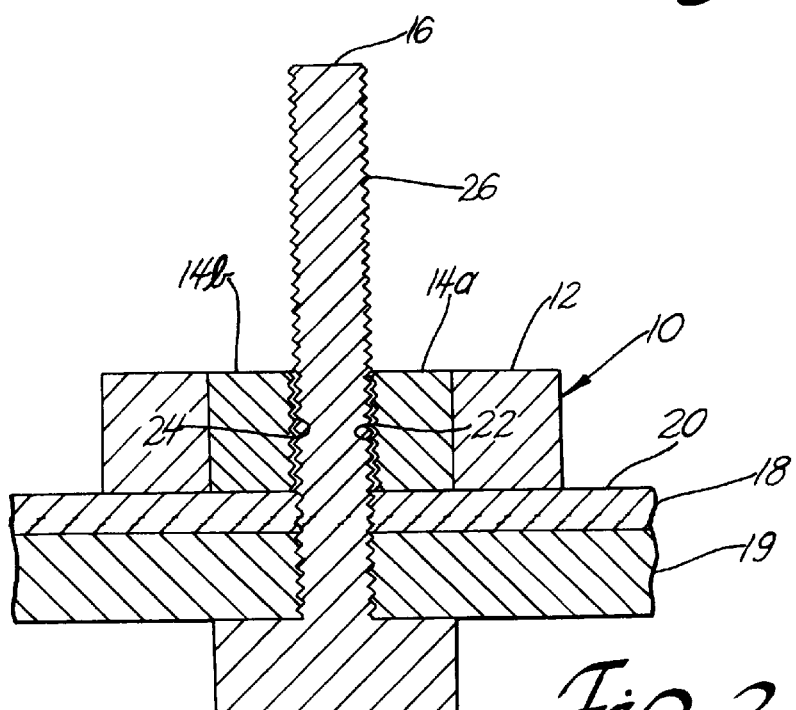
FIG. 2 is a side sectional view of the preferred embodiment of the fastener.

FIGS. 1 and 2 show an attachment mechanism comprising a torque controlled fastener 10 holding a bracket element 18 against surface 20 of plate 19 or like mounting element, wherein element 18 is part of or connects with an article to be mounted to plate 19. Fastener 10 locks and releases quickly, with a quarter turn, and includes a nut 12 and a camming collar 14. The nut has a smooth inner peripheral surface 28 encircling disjunct segments 14a and 14b of collar 14, and preferably there is a slight clearance between the collar segments and surface 28. Collar 14 surrounds any suitable elongate threaded member 16 which can be a bolt passing through mount element 18 and plate 19, as shown in FIG. 2, or can be a post welded or otherwise fixed to plate 19. Likewise, plate 19 can be a floor, wall or any structure upon which an article is to be mounted.

Nut 12 and collar 14 face on surface 20 of element 18, the collar segments having threads 22 and 24 engaging similar threads 26 of member 16. A ridge-like, cam riding boss 30 projects radially from inner peripheral surface 28 toward collar 14. Preferably in the FIG. 1 position, a slight clearance exists between the boss and the collar. Due to this clearance and the clearance between the collar and surface 28, nut 12 can be removed from or replaced about collar 14. Hence, the FIG. 1 arrangement is easily achieved by placing the collar segments about member 16 and then placing nut 12 around the segments. Conversely, when nut 12 is taken off collar 14, the collar segments are removable from member 16.

Still referring to FIG. 1, as nut 12 turns clockwise, boss 30 rides on the surface of cam sector 32 towards groove 34 so that segments 14a and 14b are forced together. The collar's right-handed threaded engagement with member 16 and facial engagement with surface 20 prevent the collar from rotating with nut 12. After approximately a quarter turn, when boss 30 reaches groove 34 and seats therein, member 16 is clinched between segments 14a and 14b.

So long as nut 12 is rotated no further clockwise, collar 14 exerts a predictable, desired clamping force against surface 20. The clamping force preferably is controlled by varying the design of boss 30 or the shape of cam sector 32. Of course this force can also be controlled by varying other design details of the nut, collar or even member 16. Due to the force control occurring when nut 12 rotates clockwise only until boss 30 in is groove 34, fastener 10 acts as a torque-controlled or torque-limited fastener.

It may be desired to rotate nut 12 further clockwise once boss 30 reaches groove 34, the further rotation being a predetermined angular distance. During the further rotation, boss 30 bears against excurvation 31, which borders groove 34 at groove side 35. Excurvation 31 may take varied configurations from a lobe-like projection of FIG. 1 to a generally semicircular curve congruent with the upper half of surface 28 in that figure. As also shown in FIG. 1, excurvation 31 tangentially contacts inner peripheral surface 28. Note that excurvation 31 and groove side 35 extend further from member 16 than any portion of cam sector 32 or groove side 36 adjacent thereto.

Since the further rotation is predetermined angular distance, the clamping force and torque of fastener 10 can be calculated in known fashion, whereby fastener 10 remains a torque-controlled or torque-limited fastener. Further, the torque required to rotate collar 14 counterclockwise on member 16 is now greater than the torque required to rotate boss 30 past side 36 of groove 34. Hence, turning nut 12 counterclockwise a quarter turn or less will remove boss 12 from groove 34 and carry boss away from groove 34 until collar 34 no longer clinches member 16. Nut 12 can then be removed from collar 14, whereupon the collar segments can be removed from member 16.

Figure 3:
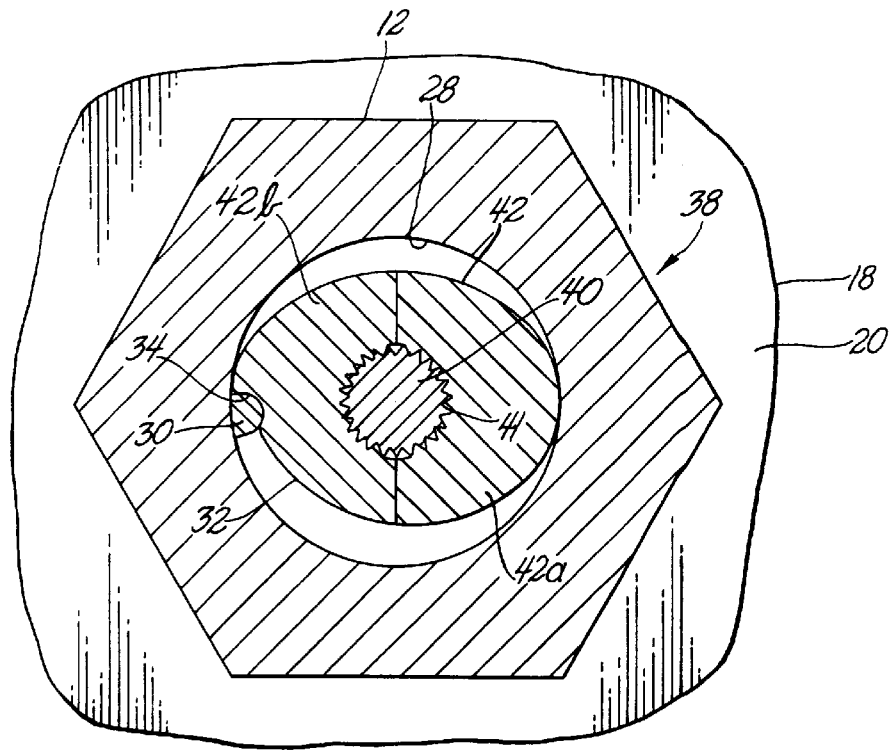
FIG. 3 is a plan sectional view of a first alternate embodiment of the fastener.

FIG. 3 shows an alternate embodiment 38 of the fastener shown in FIGS. 1 and 2. The FIG. 3 embodiment is similar to FIG. 1, except that threaded member 16 is replaced by a post or elongate member 40 having an annular array of spline-like teeth 41, and collar 14 is replaced by collar 42. Segments 42a and 42b of collar 42 have teeth that mesh with the teeth of member 40.

Figure 4:
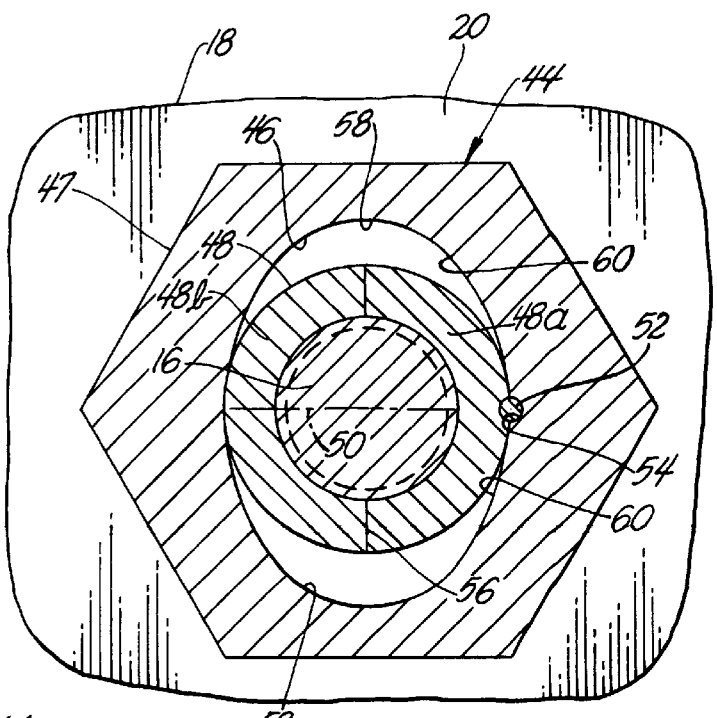
FIG. 4 is a plan sectional view of a second alternate embodiment of the fastener.

FIG. 4 shows another embodiment 44 of my fastener, wherein nut 47 defines an elliptical inner peripheral surface 46 having a minor diameter 50. Within nut 47 is a segmented circular collar 48 having arcuate segments 48a and 48b threadingly engaged to member 16. The diameter of collar 48 when the threads are so engaged is slightly smaller than minor diameter 50.

Fixed to the outer diametrical surface of collar 48 is a cam riding projection 52 that interferingly fits into a complimentary elongate groove 54 in surface 46 of the nut, whereby collar 48 is locked into position on member 16. When nut 47 is turned, collar 48 turns with it and fastener 44 acts as a conventional nut. However, once collar 48 screws sufficiently tightly against surface 20, collar 48 will stop even if the nut is turned further, whereby a torque limiting effect is achieved.

To release fastener 44 after collar 48 stops, nut 47 is turned further in the previous angular direction. Groove 54 will escape projection 52 and approach a position radially aligned with one of boundaries 56 between the collar segments. Meanwhile, one of points 58, which are on surface 46 at the ends of the surface's major diameter, moves a quarter turn toward a position opposing projection 52. When a point 58 reaches that opposing position, nut 47 can be removed from collar 48 and collar segments 48a and 48b can be removed from member 16.

Locking fastener 44 onto member 16 is essentially the reverse of the foregoing process. It will be noted that as projection 52 approaches groove 54, the projection rides on one of surface zones 60 adjacent groove 54. These surfaces may be regarded as cam surfaces, and the engagement of projection 52 therewith forces collar segments 42a and 42b into a tight hold on member 16.

Figure 5:
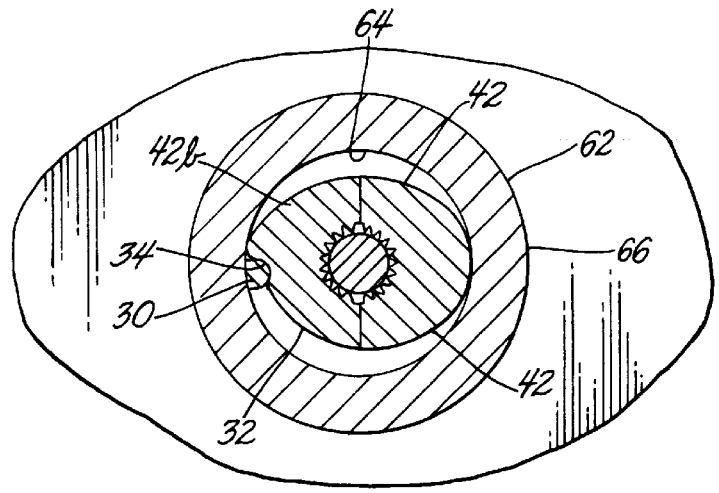
FIG. 5 is a plan sectional view of a third alternate embodiment of the invention.
Figure 6:
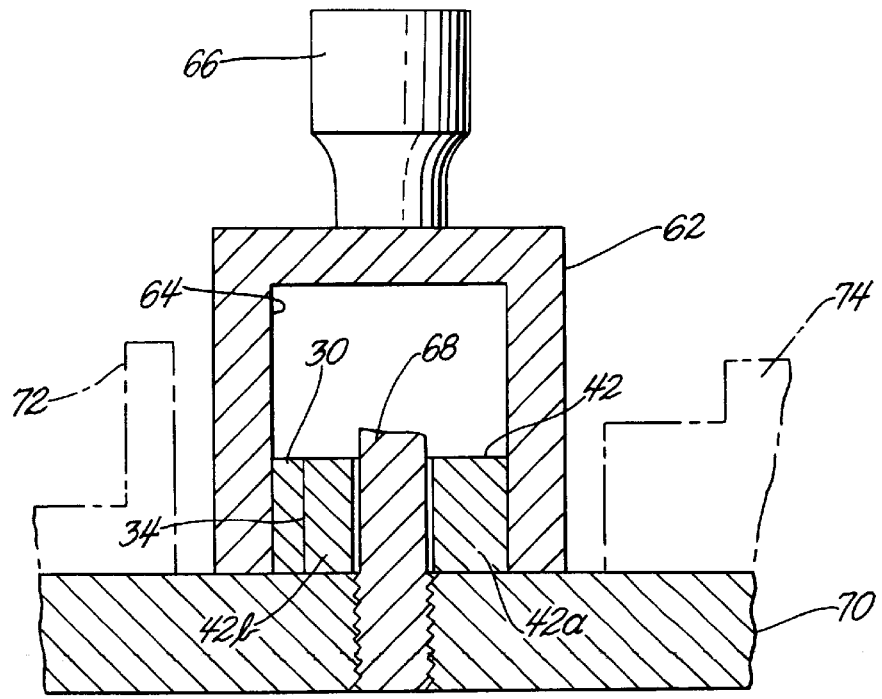
FIG. 6 is a side sectional view of the third alternate embodiment of the invention.

In FIGS. 5 and 6 is shown another embodiment of my invention wherein the main difference from the foregoing embodiments is the replacement of nut 12 by socket 62. Socket 62 is much like a conventional socket used for socket wrenches and the like, except that its inner diametrical surface 64 is smooth, round and not polygonal. The external shape of socket 62 is shown to be round in FIG. 5, but that exterior shape could also be polygonal, like the exterior of nut 12 in the other embodiments herein. As seen in FIG. 6, socket 62 has a conventional stem 66 by which the socket can be engaged to a socket wrench handle (not shown).

Cam 42 in FIGS. 5 and 6 is exactly the same as the cam shown in FIGS. 1 through 4. In addition, socket 62 interacts with cam 42 in the same fashion that nut 12 interacts with cam 42. In FIGS. 5 and 6, when the cam segments close together, the cam's teeth grip the round, smooth shank portion of threaded member 68. Threaded member 62 can then be screwed into or out of substrate element 70, which is typically a block, plate or bracket component.

In FIG. 6, threaded member 68 is a bolt whose head has been twisted off by excess torque. The location of member 68 near neighboring elements 72 and 74 prevent access to the member by conventional tools such as vice grips or pliers. The embodiment of the invention shown in FIGS. 5 and 6 allows removal of the bolt.

I wish it to be understood that I do not desire to be limited to the exact details of construction or method shown herein since obvious modifications will occur to those skilled in the relevant arts without departing from the spirit and scope of the following claims.

What is claimed is:

1. A quick locking quickly removable torque controlled mechanism for fastening one article to another, comprising:

a mounting element;

a bracket element disposed on the mounting element;

an elongate member protruding from the mounting element;

a nut faced on the bracket element and radially remote from the elongate member, an entire inner peripheral surface of the nut being smooth;

a collar surrounded by the nut and retained on the elongate member by the nut, the collar being comprised of a plurality of collar sections;

generally arcuate jaw-like portions of the collar sections engaged with the elongate member;

a cam surface on the collar;

a boss on the inner peripheral surface, the boss being in opposed relation to the cam surface;

a groove defined in the in the collar adjacent the cam surface;

an excurvation adjacent the groove at an opposite side of the groove from the cam surface, the excurvation extending further from the elongate member than the cam surface;

the collar and nut having a first relative rotational position wherein the nut and collar define a first clearance therebetween and wherein the boss and collar define a second clearance between themselves, wherein the nut is removable from the collar; and the collar and nut having a second relative rotational position wherein the boss engages the groove so that the nut interferingly squeezes the collar portions together, the second relative rotational position being less than one full turn from the first relative rotational position.

2. The mechanism of claim 1 wherein the elongate member is a threaded member and the generally arcuate portions of the collar sections are in threaded engagement with the threaded member.

3. The mechanism of claim 1 wherein the collar sections are disjunct elements held in opposed relation by the nut.

* * * * *